(12) United States Patent
Rui et al.

(10) Patent No.: US 11,600,460 B2
(45) Date of Patent: Mar. 7, 2023

(54) SYSTEM FOR LIMITING A PEAK CURRENT OF SHORT-CIRCUIT CURRENT

(71) Applicant: ANHUI ONESKY ELECTRIC TECH. CO. LTD, Anhui (CN)

(72) Inventors: Jun Rui, Anhui (CN); Yingang Yu, Anhui (CN); Xinchun Hong, Anhui (CN); Xisheng Wu, Anhui (CN); Wenbi Chen, Anhui (CN); Chunlin Tang, Anhui (CN); Ling Li, Anhui (CN)

(73) Assignee: ANHUI ONESKY ELECTRIC TECH. CO. LTD, Hefei (CN)

( * ) Notice: Subject to any disclaimer, the term of this patent is extended or adjusted under 35 U.S.C. 154(b) by 0 days.

(21) Appl. No.: 17/850,413

(22) Filed: Jun. 27, 2022

(65) Prior Publication Data

US 2022/0344116 A1 Oct. 27, 2022

Related U.S. Application Data

(63) Continuation of application No. PCT/CN2022/072566, filed on Jan. 18, 2022.

(30) Foreign Application Priority Data

Jan. 27, 2021 (CN) .......................... 202110110089.7

(51) Int. Cl.
*H02H 7/00* (2006.01)
*H01H 33/666* (2006.01)
(Continued)

(52) U.S. Cl.
CPC ...... *H01H 33/6661* (2013.01); *H01H 33/593* (2013.01); *H02H 7/1216* (2013.01)

(58) Field of Classification Search
None
See application file for complete search history.

(56) References Cited

U.S. PATENT DOCUMENTS

| 4,286,301 A | 8/1981 | Pham Van | |
|---|---|---|---|
| 4,438,474 A * | 3/1984 | Paice | H02J 3/1807 505/850 |

(Continued)

FOREIGN PATENT DOCUMENTS

| CN | 101604835 A | 12/2009 |
|---|---|---|
| CN | 201789284 U | 4/2011 |

(Continued)

OTHER PUBLICATIONS

International Search Report dated Apr. 4, 2022 for International Patent Application PCT/CN2022/072566, 5 pages.

*Primary Examiner* — Stephen W Jackson
(74) *Attorney, Agent, or Firm* — Morgan Lewis & Bockius LLP

(57) ABSTRACT

A system for limiting a peak current of short-circuit current comprises a first high-frequency branch configured to provide a first high-frequency current to a first switch (1SKa) of a first phase branch of a three-phase AC when the first phase branch occurs a short-circuit; a second high-frequency branch configured to provide a second high-frequency current to a second switch (1SKc) of a second phase branch of the three-phase AC when the second phase branch occurs a short-circuit; and a third phase branch of the three-phase AC connected in parallel with the first phase branch and the second phase branch and configured to always supply power.

18 Claims, 8 Drawing Sheets

(51) Int. Cl.
*H01H 33/59* (2006.01)
*H02H 7/12* (2006.01)

(56) References Cited

U.S. PATENT DOCUMENTS

| | | | |
|---|---|---|---|
| 4,642,747 A | 2/1987 | Cho | |
| 11,159,094 B2 * | 10/2021 | Westerweller | H02J 3/36 |
| 2006/0151437 A1 * | 7/2006 | Rakus | H01H 9/46 |
| | | | 218/34 |
| 2014/0078622 A1 | 3/2014 | Crane | |

FOREIGN PATENT DOCUMENTS

| | | |
|---|---|---|
| CN | 105375454 A | 3/2016 |
| CN | 113285433 A | 8/2021 |
| JP | 09231877 A | 9/1997 |

* cited by examiner

SYSTEM FOR LIMITING A PEAK CURRENT OF SHORT-CIRCUIT CURRENT

CROSS-REFERENCE TO RELATED APPLICATIONS

This application is a continuation of International Patent Application No. PCT/CN2022/072566, filed Jan. 18, 2022, which claims priority to Chinese Patent Application No. 202110110089.7, filed Jan. 27, 2021, the contents of both of which are hereby incorporated by reference in their entireties.

TECHNICAL FIELD

The present invention relates to the field of electric power, and more particularly to a system for limiting a peak current of short-circuit current.

BACKGROUND

Expeditious development of industrialization and urbanization boosts a continuous growth of power demands in a long run, which poses a heavy and complicated task on grid development; therefore, it is particularly urgent to build up a robust smart grid. Currently, the smart grid is developing towards extra-high voltage and ultra-high voltage, and developing high-performance and high-reliability circuit breakers matched thereto may provide a strong technical support to the security and reliability for power supply of smart grids. Expeditious development of industrialization and urbanization boosts a continuous growth of power demands in a long run, which poses a heavy and complicated task on grid development; therefore, it is particularly urgent to build up a smart distribution grid. Developing a new generation of high-reliability smart fast switch matched thereto may provide a strong technical support to the security and reliability for power supply of smart distribution grids.

Traditionally, in order to enhance the security of the grid, a vacuum switch is generally employed to cut off a short-circuit current. Compared with oil pressure switches, sulfur hexafluoride switches and explosion switches, the vacuum switch have the following advantages at least.

(1) When cutting off short-circuit current, the oil pressure switch will cause oil injection and emission phenomenon, which brings pollution to conditions, but the vacuum switch will not.

(2) When cutting off short-circuit current, due to the high temperature of the arc, the sulfur hexafluoride switch will decompose the sulfur hexafluoride gas to produce toxic substances, but the vacuum switch will not.

(3) The explosion switch is a disposable device, and must be replaced once used when cutting off the power, but the vacuum switch will not.

However, the vacuum switch still has a problem: the ability for restricting the first half wave short-circuit current peak is limited, thereby affecting its dynamic stability. The specific reasons are as follows.

FIG. 1 is a schematic diagram of a vacuum switch opening short-circuit current according to the prior art. As shown in FIG. 1, the time point $t_0$ and the time point $t_3$ represent two zero-crossing points of current respectively. For a conventional 50 Hz AC circuit, the time between $t_0$ and $t_3$ is 10 milliseconds.

Assuming at the time point $t_1$, the vacuum switch is opened because of the short-circuit current. And because of the high vacuum degree of the vacuum switch, even if it has been opened, its ions will break down and develop an arc, which could actually extinguish until the short-circuit current passes through the zero-point $t_3$ (that is, the first half wave). It will apparently increase the load on the vacuum switch and influence the lifetime of the vacuum switch.

Particularly at the time point $t_2$, the short-circuit current peak will be more disruptive to the dynamic stability of the vacuum switch.

Therefore, it is urgent for the vacuum switch solve the problem of limiting a peak current of short-circuit current and thereby lowering the damage to the dynamic stability.

SUMMARY

The present invention aims to provide a system for limiting a peak current of short-circuit current, which can solve the problem in the prior art that the dynamic stability of the switch is disrupted by the first half-wave short-circuit current peak.

According to one aspect of the present invention, there is provided a system for limiting a peak current of short-circuit current, comprising: a first high-frequency branch configured to provide the first high-frequency current to a first switch of a first phase branch of a three-phase AC when the first phase branch occurs a short-circuit, wherein the first high-frequency current is configured to cause a zero-crossing point of a short-circuit current to appear before a zero-crossing point of the three-phase AC; a second high-frequency branch configured to provide a second high-frequency current to a second switch of a second phase branch of the three-phase AC when the second phase branch occurs a short-circuit, wherein the second high-frequency current is configured to cause a zero-crossing point of a short-circuit current to appear before a zero-crossing point of the three-phase AC and a third phase branch of the three-phase AC connected in parallel with the first phase branch and the second phase branch and configured to always supply power.

Preferably, the first switch is configured to be closed when the first phase branch works normally and to be opened when the first phase branch occurs a short-circuit; the first high-frequency branch is connected in parallel with the first switch and is configured to be opened when the first phase branch works normally and to provide the first high-frequency current to the first switch when the first phase branch occurs a short-circuit; the second switch is configured to be closed when the second phase branch works normally and to be opened when the second phase branch occurs a short-circuit; the second high-frequency branch is connected in parallel with the second switch and is configured to be opened when the second phase branch works normally and to provide the second high-frequency current to the second switch when the second phase branch occurs a short-circuit.

Preferably, the first high-frequency branch comprises: a first high-frequency switch for controlling current discharge configured to be opened when the first phase branch works normally and to be closed when the first phase branch occurs a short-circuit; and a first converter reactor and a first converter capacitor connected in series with the first high-frequency switch and configured to provide the first high-frequency current to the first switch when the first high-frequency switch is closed; and the second high-frequency branch comprises: a second high-frequency switch for controlling current discharge configured to be opened when the first phase branch works normally and to be closed when the first phase branch occurs a short-circuit; and a second converter reactor and a second converter capacitor connected in series with the second high-frequency switch and configured to provide the second high-frequency current to the second switch when the second high-frequency switch is closed.

Preferably, a response time of the first high-frequency switch and a response time of the second high-frequency switch are both microseconds.

Preferably, the first converter capacitor is charged in advance by a line voltage of the first phase branch and the third phase branch; and the second converter capacitor is charged in advance by a line voltage of the second phase branch and the third phase branch.

Preferably, the first converter capacitor and the second converter capacitor are both charged in advance by an external power supply other than the three-phase AC.

Preferably, the system for limiting a peak current of short-circuit current further comprises: a first current-limiting branch connected in parallel with the first high-frequency branch, wherein the first current-limiting branch comprises a first current-limiting reactor; and a second current-limiting branch connected in parallel with the second high-frequency branch, wherein the second current-limiting branch comprises a second current-limiting reactor.

Preferably, the system for limiting a peak current of short-circuit further comprises: a first energy-absorbing branch connected in parallel with the first high-frequency branch, wherein the first energy-absorbing branch comprises a first energy absorber; and a second energy-absorbing branch connected in parallel with the second high-frequency branch, wherein the second energy-absorbing branch comprises a second energy absorber.

Preferably, the system for limiting a peak current of short-circuit further comprises a plurality of cabinets, wherein a first cabinet is arranged with the first high-frequency branch, the first current-limiting branch and the first energy-absorbing branch; a second cabinet is arranged with the second high-frequency branch, the second current-limiting branch and the second energy-absorbing branch; a third cabinet is arranged with the first phase branch, the second phase branch and the third phase branch, wherein the third phase branch is arranged in the middle of the first phase branch and the second phase branch.

Preferably, the system for limiting a peak current of short-circuit further comprises: a three-phase switch located within the third cabinet and configured to open the three-phase AC.

The present invention superimposes the high-frequency current on the original short-circuit current of the switch, thereby the total time from the arc generation to extinction at the zero-crossing point and then to the judgement by the control system will shorter than the time that the short-circuit current peak appears. Therefore, it can effectively lower the damage of the short-circuit current peak to the dynamic stability of the switch and lower the impact on system equipment.

BRIEF DESCRIPTION OF THE DRAWINGS

The drawings described herein are intended to provide a further understanding of the present invention, forming a part of the present application, and schematic embodiments of the present invention and description wherein are configured to construe the present invention, not constituting an improper limitation of the present invention. In the drawings.

DETAILED DESCRIPTION OF EMBODIMENTS

Figure 1:
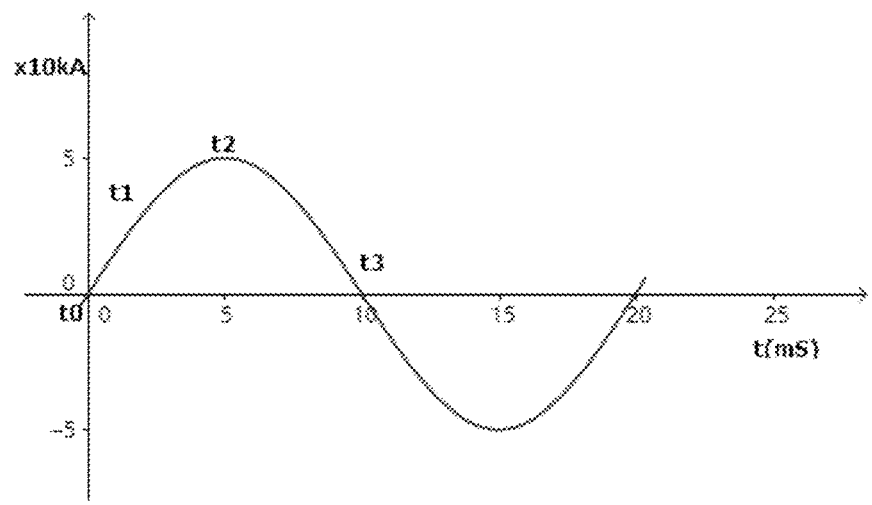
FIG. 1 is a schematic diagram of the vacuum switch opening short-circuit current according to the prior art.
Figure 2:
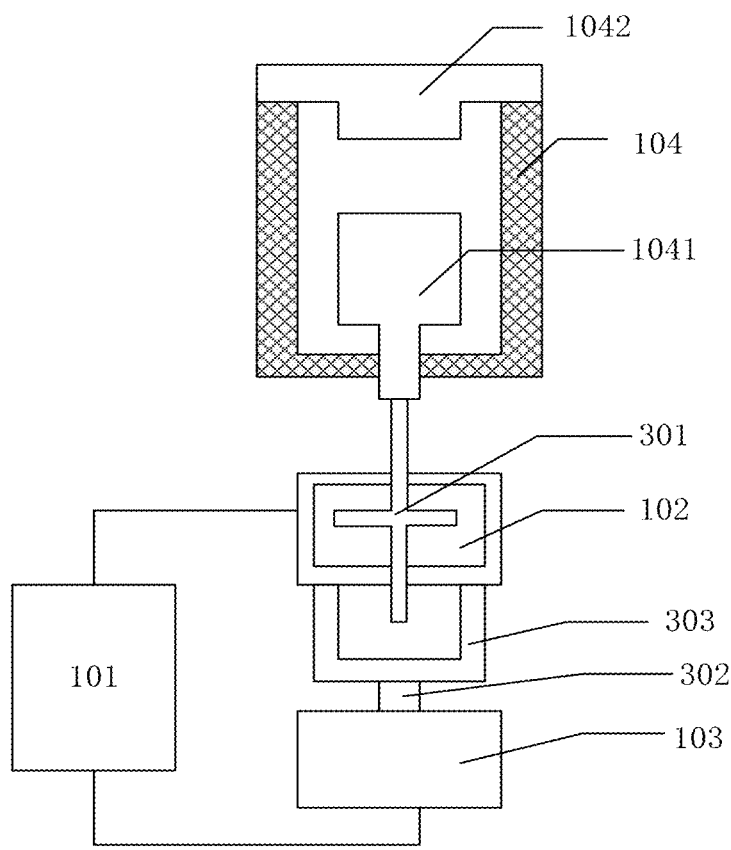
FIG. 2 is a schematic diagram of a system for limiting a peak current of short-circuit current (line voltage charging) according to an embodiment of the present invention.

It needs to be noted that the embodiments and the features in the embodiments in the present application can combine with each other without conflict. Hereinafter, the present invention will be described in further detail with reference to the accompanying drawings and in conjunction with embodiments Embodiments of the present invention provide a system for limiting a peak current of short-circuit current. FIG. 2 is a schematic diagram of a system for limiting a peak current of short-circuit current (line voltage charging) according to an embodiment of the present invention. As shown in FIG. 2, the system for limiting a peak current of short-circuit current comprises: a first high-frequency branch configured to provide a first high-frequency current to a first switch 1SKa of a first phase branch of a three-phase AC when the first phase branch occurs a short-circuit, wherein the first high-frequency current is configured to cause a zero-crossing point of a short-circuit current to appear before a zero-crossing point of the three-phase AC, in order to make the first converter reactor Lfa and the first converter capacitor Ca into the circuit in series as soon as possible to limit the peak of the short-circuit current; a second high-frequency branch configured to provide a second high-frequency current to a second switch 1SKc of a second phase branch of the three-phase AC when the second phase branch occurs a short-circuit, wherein the second high-frequency current is configured to cause a zero-crossing point of a short-circuit current to appear before a zero-crossing point of the three-phase AC, in order to make the second converter reactor Lfa and the second converter capacitor Ca into the circuit in series as soon as possible to limit the peak of the short-circuit current; a third phase branch of the three-phase AC connected in parallel with the first phase branch and the second phase branch and configured to always supply power.

In prior art, the short-circuit current will generate an arc at the switch which cannot actually be extinguished until the short-circuit current passes through the zero-point (that is, the first half wave). Moreover, the peak of the short-circuit current can cause great damage to the dynamic stability of the switch, thereby takes enormous impact even leading to direct damage on system equipment.

The present invention superimposes a high-frequency current on the original short-circuit current of the switch, thereby the total time from the arc generation to extinction at the zero-crossing point and then to the judgement by the control system is shorter than the time that the short-circuit current peak appears. Therefore, it can effectively lower the damage of the short-circuit current peak to the dynamic stability of the switch and lower the impact on system equipment.

Meanwhile, the present invention also takes different methods for AC three-phase circuits. That is, the first phase and the second phase respectively superimpose high-frequency current; while the third phase remains unchanged with always power supply. The use environment of the present invention may be a central point non-effective grounding grid or a central point non-effective grounding generator. Specifically, according to currently design specifications, in the case of a single-phase grounding fault (single-phase short-circuit fault) of the power grid or generator, it is allowed to continue operation with the fault no more than two hours. Therefore, the beneficial effect of the present invention is as below: lower the peak of the short-circuit current effectively without wrong-phase-coupling in a most cost-effective manner and regardless the short-circuit being appeared in any one of the three-phase AC circuit.

According to one embodiment of the present invention, the first switch 1SKa is configured to be closed when the first phase branch works normally and to be opened when the first phase branch occurs a short-circuit; the first high-frequency branch is connected in parallel with the first vacuum switch 1SKa and configured to be opened when the first phase branch works normally and to provide the first high-frequency current to the first switch 1SKa when the first phase branch occurs a short-circuit; and the second switch 1SKc is configured to be closed when the second phase branch works normally and to be opened when the second phase branch occurs a short-circuit; the second high-frequency branch is connected in parallel with the second switch 1SKc, and is configured to be opened when the second phase branch works normally and to provide the second high-frequency current to the second switch 1SKc when the second phase branch occurs a short-circuit.

Embodiments of the present invention further clarifies the parallel connection between the first high-frequency branch and the first phase branch, and the parallel connection between the second high-frequency branch and the second-phase branch. The connection method is conducive to superimpose the high-frequency current on the original short-circuit current of the switch, thereby the total time from the arc generation to extinction at the zero-crossing point and then to the judgement by the control system is shorter than the time that the short-circuit current peak appears. Therefore, it can effectively lower the damage of the short-circuit current peak to the dynamic stability of the switch and lower the impact on system equipment.

It needs to be noted that the person skilled in the art can understand the parallel connection between the first high-frequency peak-limiting branch and the first-phase branch, the parallel connection between the second high-frequency peak-limiting branch and the second-phase branch are just one example. In practical applications, any circuit connection that can superimpose the high-frequency current on the original short-circuit current of the switch and thereby cause the total time from the arc generation to extinction at the zero-crossing point and then to the judgement by the control system to be shorter than the time that the short-circuit current peak appears should be included in the protection scope of the present invention.

It needs to be noted that, the person skilled in the art can also understand that, the first switch 1SKa and the second switch 1SKc above may be either a vacuum switch, or any switch capable of opening and closing while achieves manual zero-crossing such as an oil pressure switch, a sulfur hexafluoride switch or an explosion switch, which should all be included in the protection scope of the present invention.

According to one embodiment of the present invention, the first high-frequency branch comprises: a first high-frequency switch SPa for controlling current discharge configured to be opened when the first phase branch works normally and to be closed when the first phase branch occurs a short-circuit; and a first converter reactor Lfa and a first converter capacitor Ca connected in series with the first high-frequency switch SPa and configured to provide the first high-frequency current to the first switch 1SKa when the first high-frequency switch SPa is closed. Wherein, the response time of the first high-frequency switch SPa is microsecond to accurately control the discharge moment of the high-frequency current.

Embodiments of the present invention further clarifies that the first high-frequency branch is connected in series by the first high-frequency switch SPa, the first converter reactor Lfa and the first converter capacitor Ca. This connection method is conducive to quickly generate the first high-frequency current which is superimposed on the original short-circuit current of the switch, thereby causing the total time from the arc generation to extinction at the zero-crossing point and then to the judgement by the control system to be shorter than the time that the short-circuit current peak appears. Therefore, it can effectively lower the damage of the short-circuit current peak to the dynamic stability of the switch.

According to another embodiment of the present invention, the second high-frequency branch comprises: a second high-frequency switch SPc for controlling current discharge configured to be opened when the first phase branch works normally and to be closed when the first phase branch occurs a short-circuit; a second converter reactor Lfc and a second converter capacitor Cc connected in series with the second high-frequency switch SPc and configured to provide the second high-frequency current to the second switch 1SKc when the second high-frequency switch SPc is closed. Wherein, the response time of the second high-frequency switch SPc is microsecond to accurately control the discharge moment of the high-frequency current.

Embodiments of the present invention further clarifies that the second high-frequency branch is connected in series by the second high-frequency switch SPc, the second converter reactor Lfc and the second converter capacitor Cc. This connection method is conducive to quickly generate the second high-frequency current which is superimposed on the original short-circuit current of the switch, thereby causing the total time from the arc generation to extinction at the zero-crossing point and then to the judgement by the control system to be shorter than the time that the short-circuit current peak appears. Therefore, it can effectively lower the damage of the short-circuit current peak to the dynamic stability of the switch and lower the impact on system equipment.

It needs to be noted that, the person skilled in the art can also understand that, the first high-frequency switch SPa and the second-frequency switch SPc above may be either a vacuum trigger discharge gap switch, a semiconductor switch or a mechanical conduction control switch, etc., which should all be included in the protection scope of the present invention.

According to one embodiment of the present invention, the first converter capacitor Ca is charged in advance by the line voltage of the first phase branch and the third phase branch; the second converter capacitor (Cc) is charged in advance by a line voltage of the second phase branch and the third phase branch. This charging method directly employs the corresponding two phases of the three-phase AC, and has a simple and stable charging effect.

Figure 3:
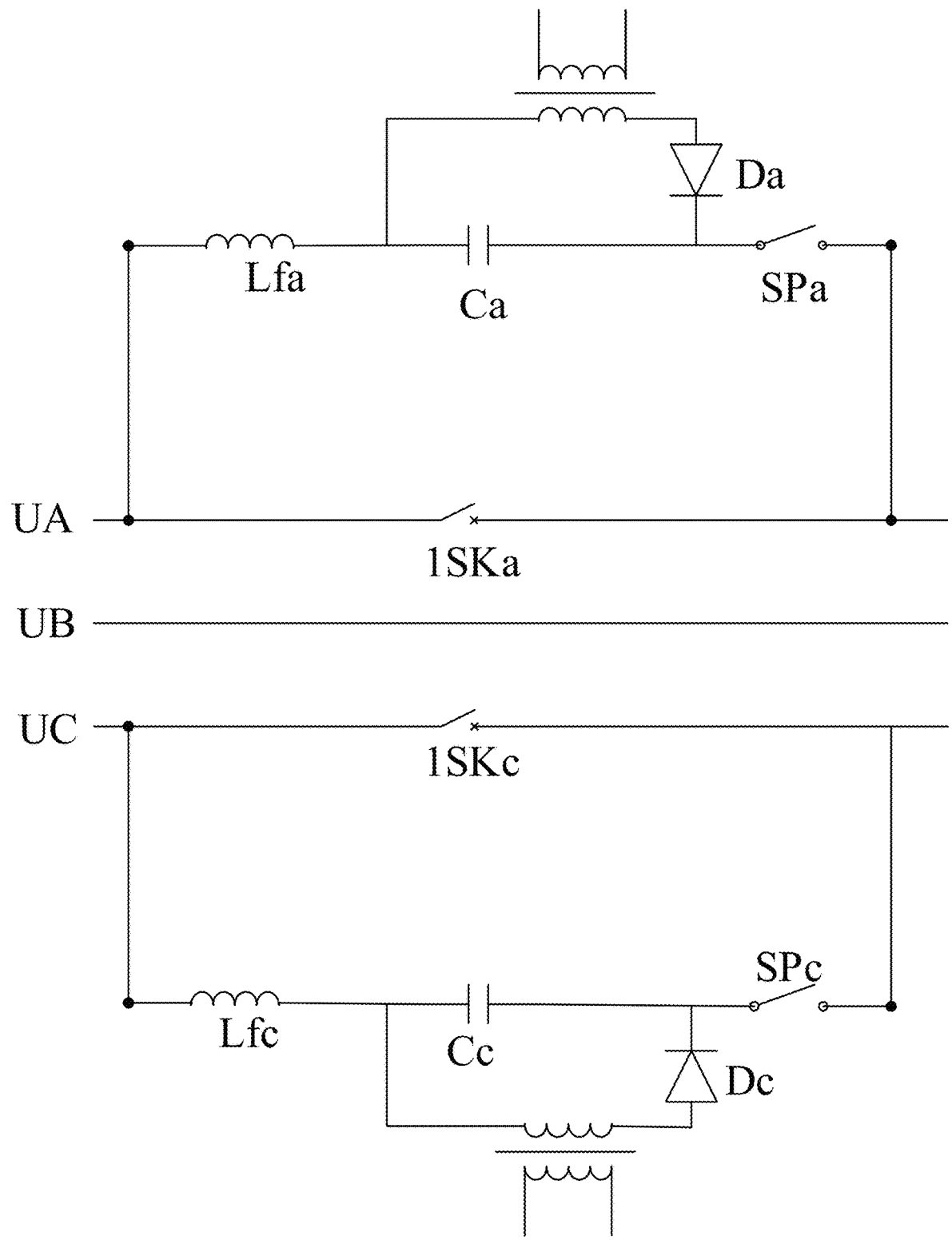
FIG. 3 is a first schematic diagram of a system for limiting a peak current of short-circuit current (external power supply charging) according to an embodiment of the present invention.

FIG. 3 is a schematic diagram of a system for limiting a peak current of short-circuit current (external power supply charging) according to an embodiment of the present invention. The difference between FIG. 3 and FIG. 2 is that the first converter capacitor Ca and the second converter capacitor Cc are both charged in advance by an external power supply other than the three-phase AC. This charging method employs an external power supply other than three-phase AC and has a stable and reliable charging effect.

Figure 4:
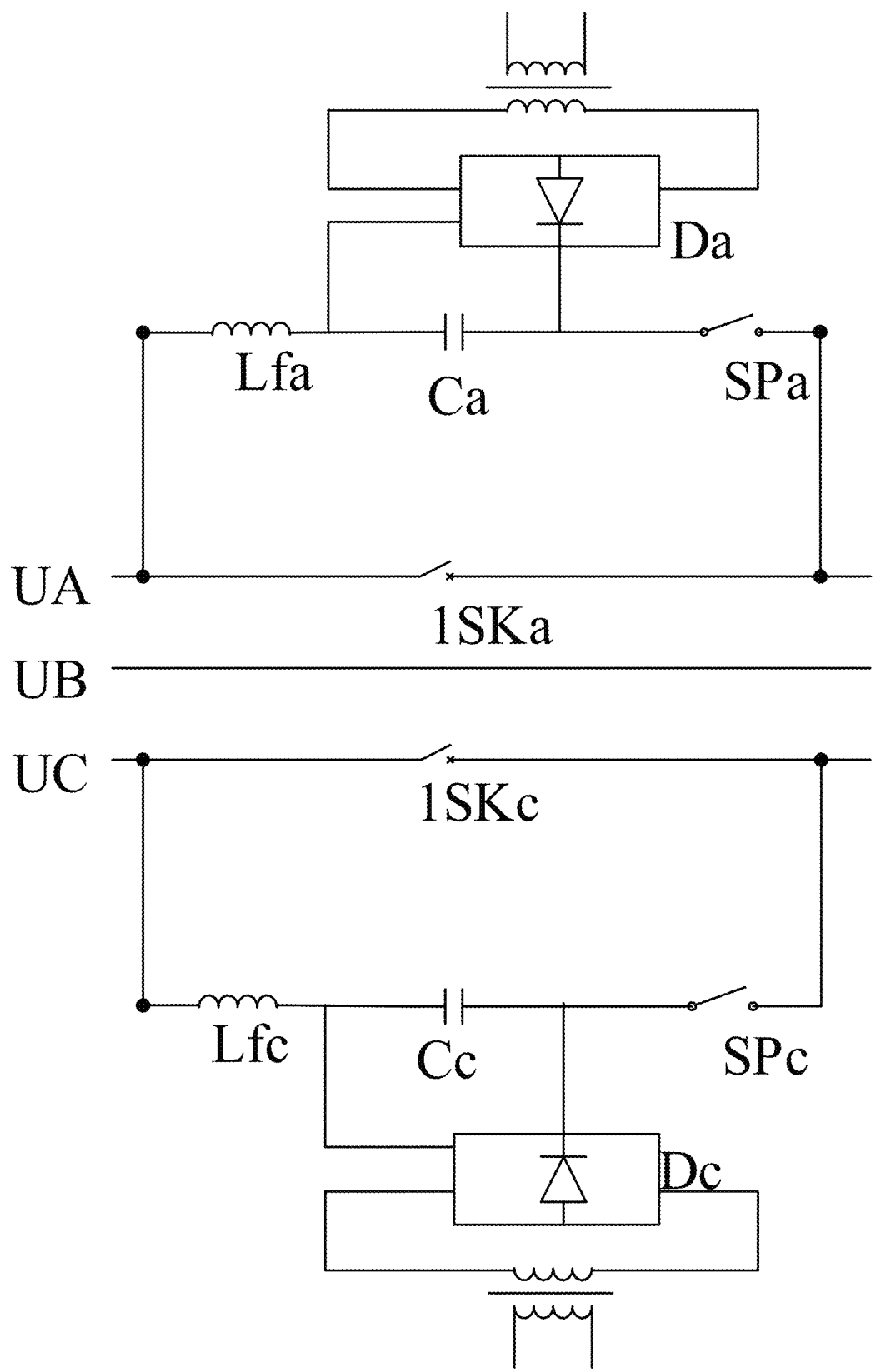
FIG. 4 is a second schematic diagram of a system for limiting a peak current of short-circuit current (external power supply charging) according to an embodiment of the present invention.
Figure 5:
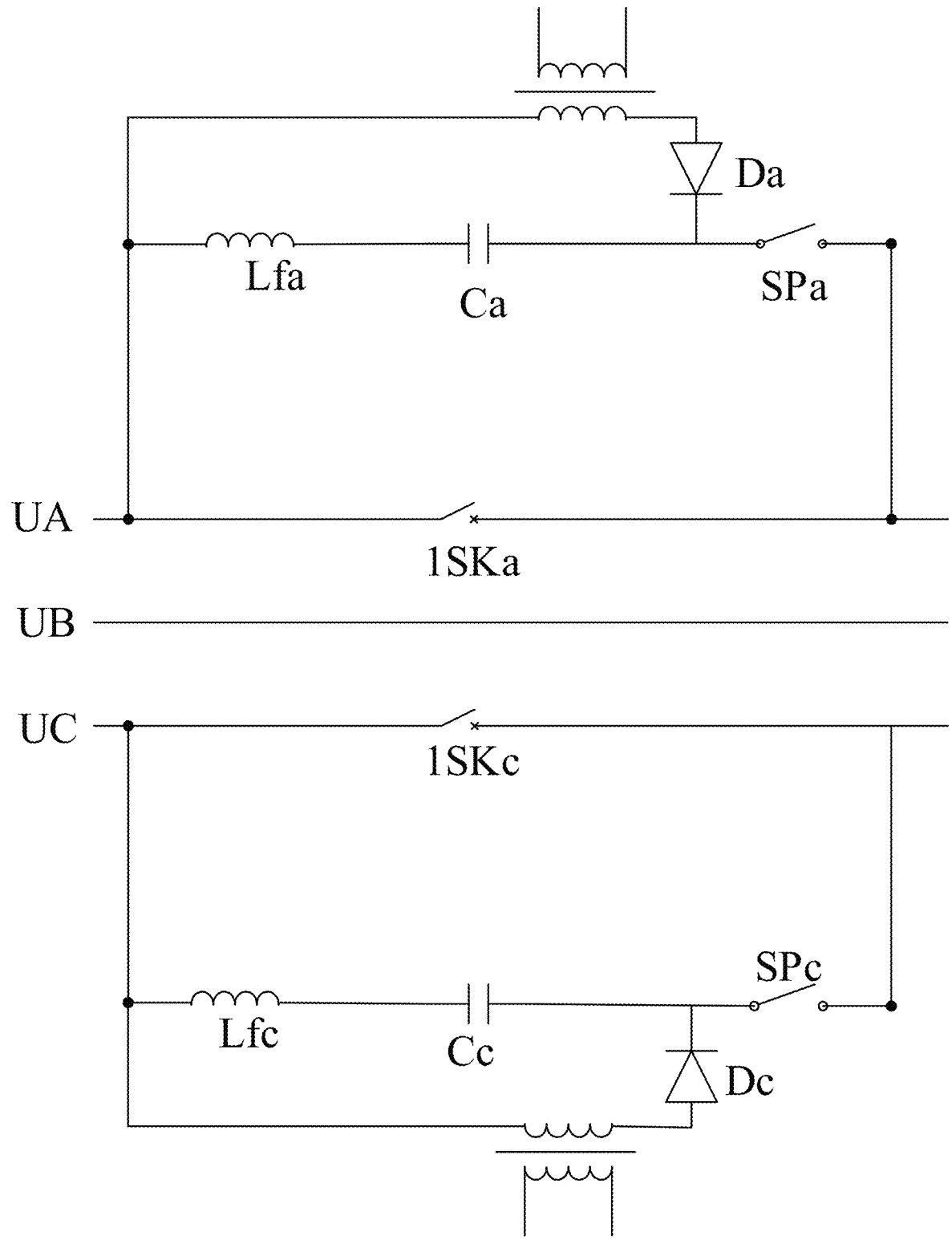
FIG. 5 is a third schematic diagram of a system for limiting a peak current of short-circuit current (external power supply charging) according to an embodiment of the present invention.
Figure 6:
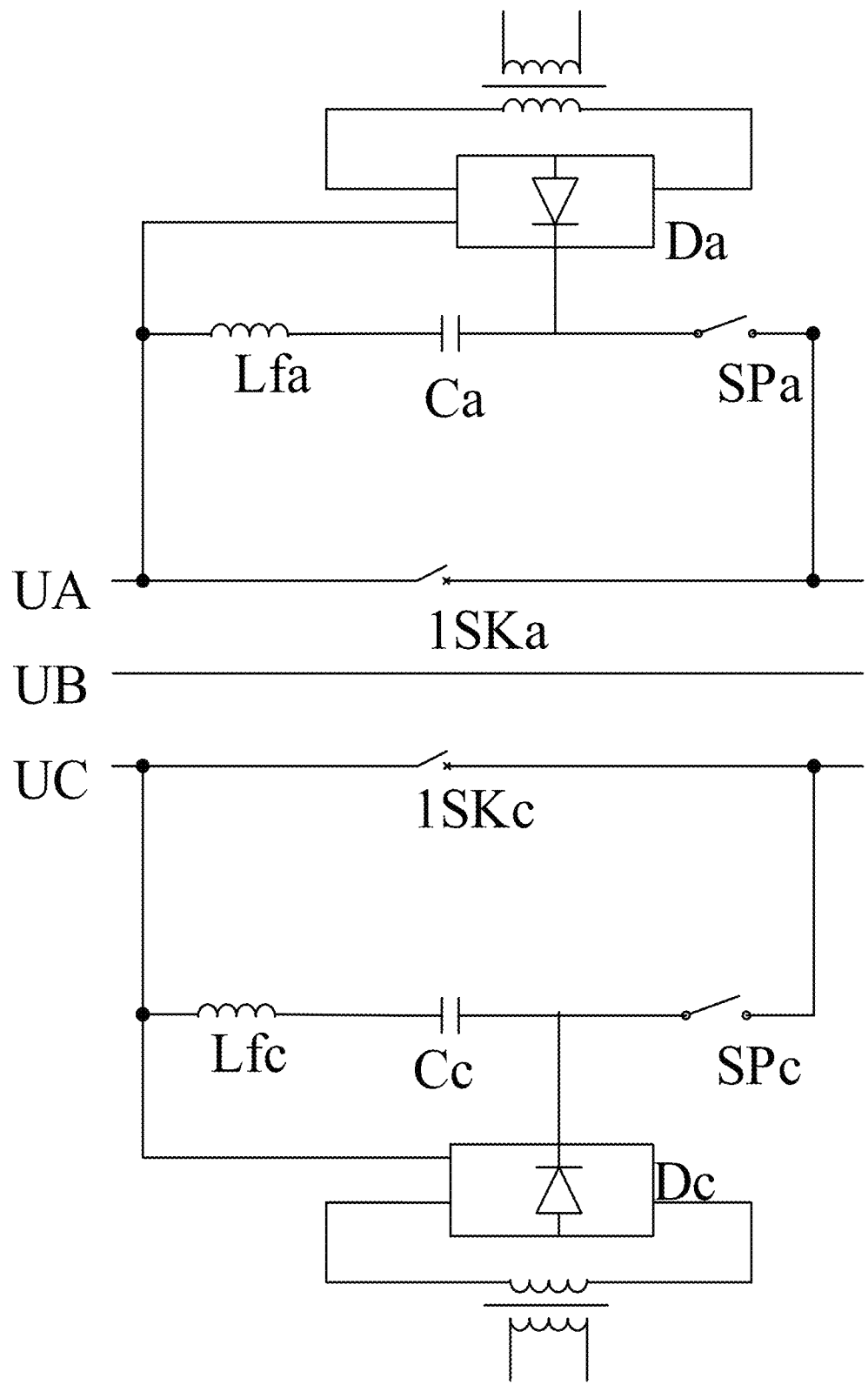
FIG. 6 is a fourth schematic diagram of a system for limiting a peak current of short-circuit current (external power charging) according to an embodiment of the present invention.

It needs to be noted that, the above external power supply charging may also employ the method in FIG. 4 to FIG. 6, which should all be included in the protection scope of the present invention. Wherein, the difference between FIG. 5 and FIG. 3 is that, the first converter reactor Lfa and the first converter capacitor Ca in FIG. 5 are charged together, while the second converter reactor Lfc and the second converter capacitor Cc in FIG. 5 are charged together. Moreover, compared with FIG. 3 and FIG. 5, FIG. 4 and FIG. 6 differs in the use of full-wave rectification.

Figure 7:
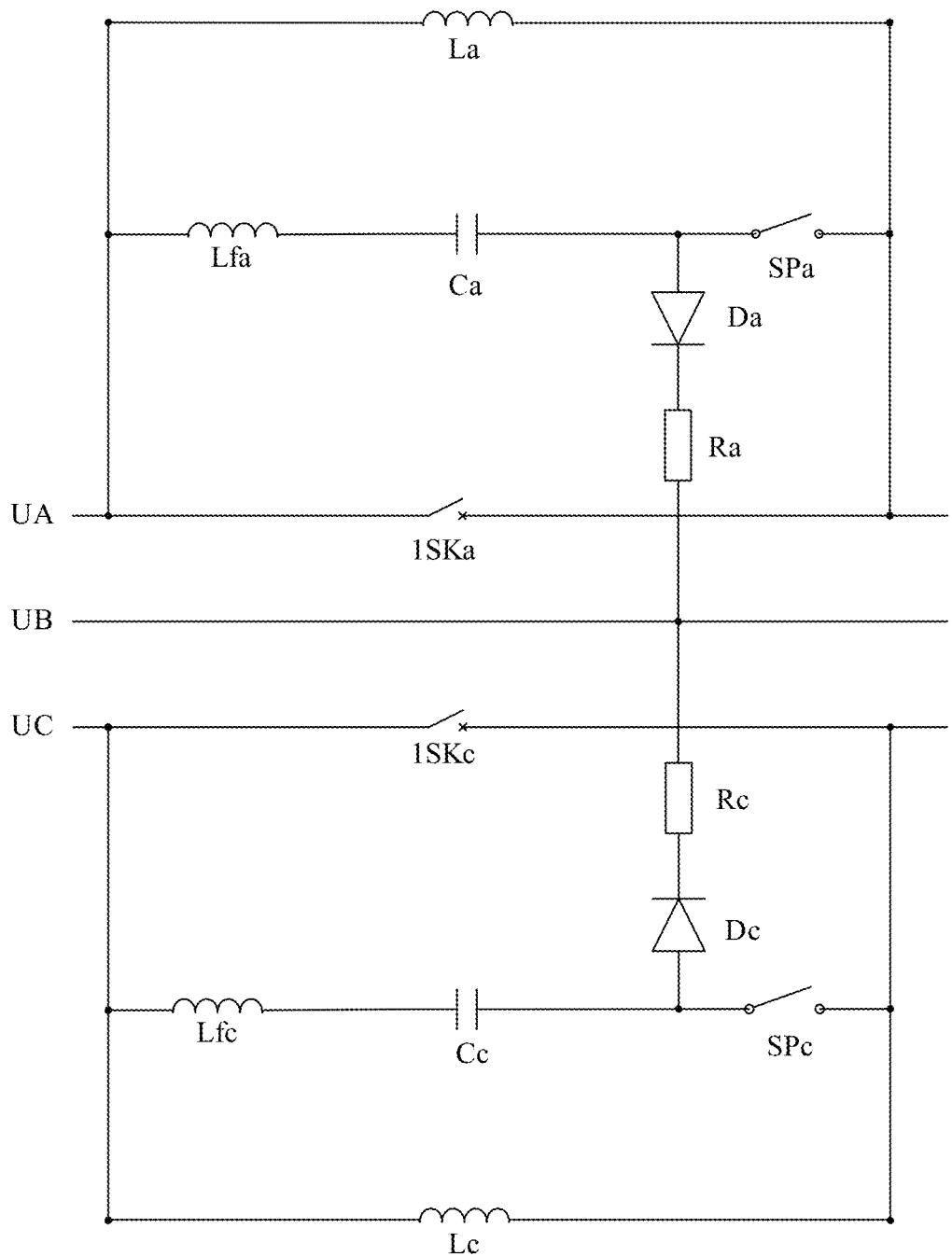
FIG. 7 is a schematic diagram of a system for limiting a peak current of short-circuit current (current-limiting branch) according to an embodiment of the present invention.

FIG. 7 is a schematic diagram of the system for limiting a peak current of short-circuit current (current-limiting branch). As shown in FIG. 7, the system further comprises a first current-limiting branch connected in parallel with the first high-frequency branch and a second current-limiting branch connected in parallel with the second high-frequency branch, wherein the first current-limiting branch comprises a first current-limiting reactor La while the second current-limiting branch comprises a second current-limiting reactor Lc.

The present embodiment adds a current-limiting branch configured to transfer and limit the short-circuit current, and therefore improve the dynamic stability of the switch. Specifically, in the case that the short-circuit current in the first phase branch and the second phase branch is cut off and the arc is quickly extinguished, it is because of the cut-off that the equipment in the grid may be damaged, and it is also because of the cut-off that the short-circuit location (e.g., which level and which branch) in the grid may be unknown. Therefore, the present embodiment adds the current-limiting branch which is configured to, after the short-circuit current in the first phase branch and the second phase branch is cut off and the arc is quickly extinguished, continuously provide to the grid with short-circuit current that has been limited, in order to employ time difference cooperation to get known on the short-circuit location (e.g., which level and which branch) in the grid and therefore avoid the damage to the equipment in the grid.

Figure 8:
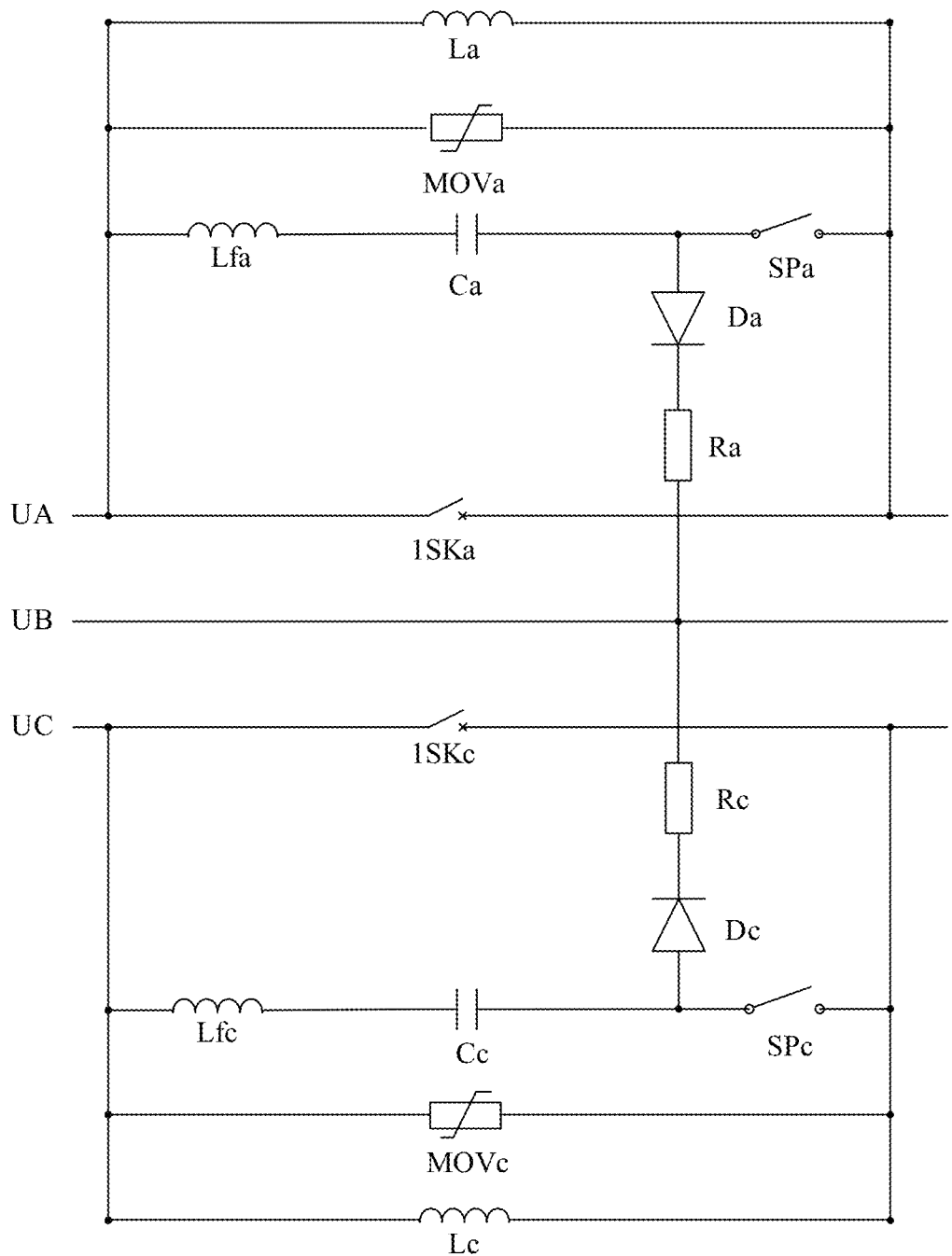
FIG. 8 is a schematic diagram of a system for limiting a peak current of short-circuit current (energy-absorbing branch) according to an embodiment of the present invention.

FIG. 8 is a schematic diagram of the system for limiting a peak current of short-circuit (energy-absorbing branch) according to an embodiment of the present invention. As shown in FIG. 8, the system further comprises a first energy-absorbing branch connected in parallel with the first high-frequency branch and a second energy-absorbing branch connected in parallel with the second high-frequency branch, wherein the first energy-absorbing branch comprises a first energy absorber MOVa while the second energy-absorbing branch comprises a second energy absorber MOVc.

The present embodiment adds an energy-absorbing branch configured to quickly transfer and absorb the energy of short-circuit current after the short-circuit current in the first phase branch and the second phase branch short-circuit current is cut off and the arc is quickly extinguished.

Figure 9:
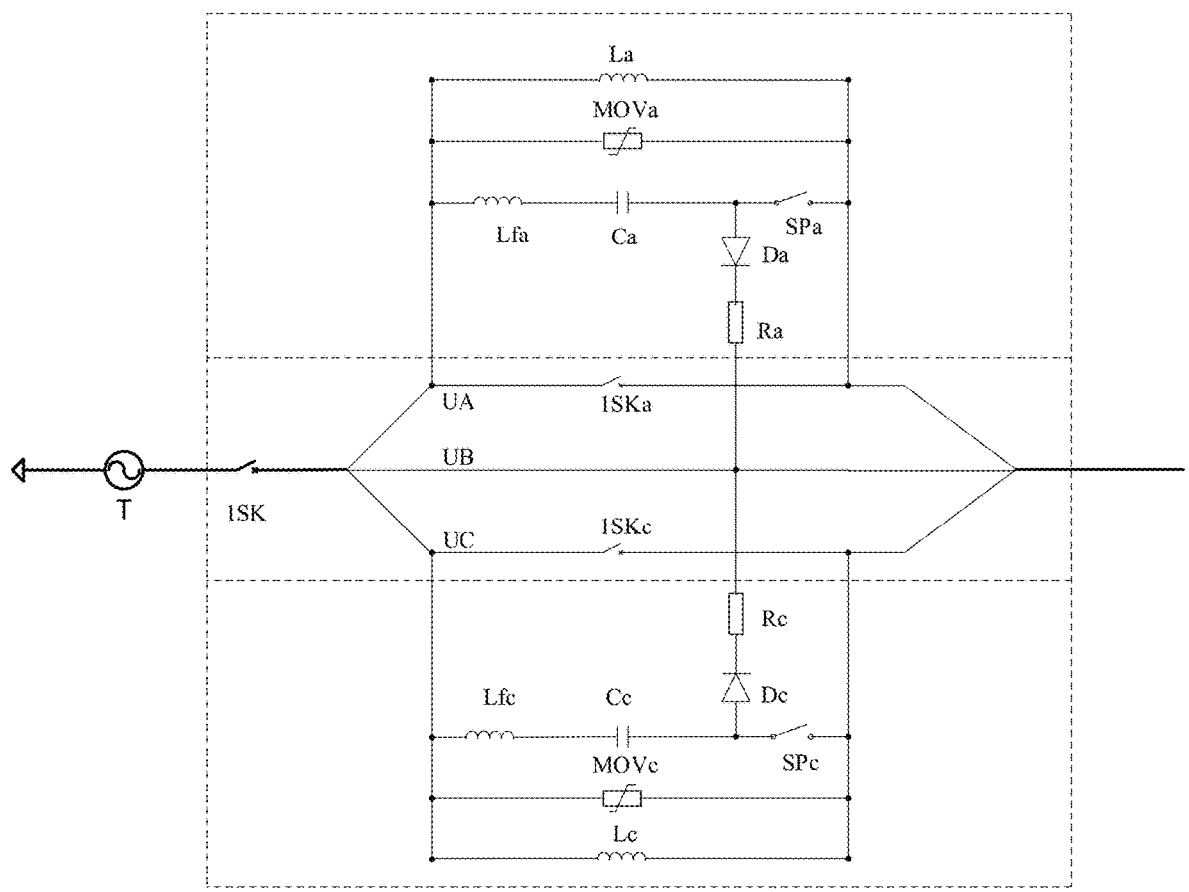
FIG. 9 is a schematic diagram of a system for limiting a peak current of short-circuit current (three cabinets) according to an embodiment of the present invention.

FIG. 9 is a schematic diagram of the system for limiting a peak current of short-circuit (three cabinets) according to an embodiment of the present invention. As shown in FIG. 9, the system further comprises three cabinets, wherein the first cabinet is arranged with the first high-frequency branch, the first current-limiting branch and the first energy-absorbing branch; the second cabinet is arranged with the second high-frequency branch, the second current-limiting branch and the second energy-absorbing branch; and the third cabinet is arranged with the first phase branch, the second phase branch and the third phase branch, wherein the third phase branch is arranged in the middle of the first phase branch and the second phase branch.

The present embodiment adds three cabinets for arranging the above branches. Specifically, the third phase branch for always supplying power is arranged in the middle of the first phase branch and the second phase branch for cutting off the short-circuit, and the three-phase branches are all arranged in the third cabinet; the branches for causing the first phase branch to be high-frequency zero-crossing, current-limiting and energy-absorbing are arranged in the first cabinet, and the branches for causing the second phase branch to be high-frequency zero-crossing, current-limiting and energy-absorbing are arranged in the second cabinet, and the first cabinet and the second cabinet are arranged on both sides of the third cabinet. Therefore, the above arrangement is conducive to the installation, operation and maintenance of electrical components.

According to an embodiment of the present invention, the system further comprises a three phase switch located within the third cabinet and configured to open the three-phase AC.

In summary, according to the above embodiments of the present invention, there is provided a system for limiting a peak current of short-circuit current, which comprises a first a first high-frequency branch, configured to provide a first high-frequency current to a first switch 1SKa of a first phase branch of a three-phase AC when the first phase branch occurs a short-circuit, wherein the first high-frequency current is configured to cause a zero-crossing point of a short-circuit current to appear before a zero-crossing point of the three-phase AC; a second high-frequency branch, configured to provide a second high-frequency current to a second switch 1SKc of a second phase branch of the three-phase AC when the second phase branch occurs a short-circuit, wherein the second high-frequency current is configured to cause a zero-crossing point of a short-circuit current to appear before a zero-crossing point of the three-phase AC, a third phase branch of the three-phase AC, connected in parallel with the first phase branch and the second phase branch, and configured to always supply power. The present invention superimposes the high-frequency current on the original short-circuit current of the switch, thereby the total time from the arc generation to extinction at the zero-crossing point and then to the judgement by the control system is shorter than the time that the short-circuit current peak appears. Therefore, it can effectively lower the damage of the short-circuit current peak to the dynamic stability of the switch and lower the impact on system equipment.

The above are preferred embodiments of the present invention, not intended to limit the present invention. For the person skilled in the art, the present invention may have various modifications and variations. Any modifications, equivalent substitutions made within the spirit and principles of the present invention should be included within the protection scope of the present invention.

We claim:

1. A system for limiting a peak current of short-circuit current, comprising:
    a first high-frequency branch, configured to provide a first high-frequency current to a first switch (1SKa) of a first phase branch of a three-phase AC when the first phase branch occurs a short-circuit, wherein the first high-frequency current is configured to cause a zero-crossing point of a short-circuit current to appear before a zero-crossing point of the three-phase AC;
    a second high-frequency branch, configured to provide a second high-frequency current to a second switch (1SKc) of a second phase branch of the three-phase AC when the second phase branch occurs a short-circuit, wherein the second high-frequency current is configured to cause a zero-crossing point of a short-circuit current to appear before a zero-crossing point of the three-phase AC;
    a third phase branch of the three-phase AC, connected in parallel with the first phase branch and the second phase branch, and configured to always supply power; and
    a plurality of cabinets, in which a first cabinet is arranged with the first high-frequency branch, a second cabinet is arranged with the second high-frequency branch, and a third cabinet is arranged with the first phase branch, the second phase branch and the third phase branch, wherein the third phase branch is arranged in the middle of the first phase branch and the second phase branch.

2. The system according to claim 1, wherein,
    the first switch (1SKa) is configured to be closed when the first phase branch works normally and to be opened when the first phase branch occurs a short-circuit;
    the first high-frequency branch is connected in parallel with the first switch (1SKa), and is configured to be opened when the first phase branch works normally and to provide the first high-frequency current to the first switch (1SKa) when the first phase branch occurs a short-circuit;
    the second switch (1SKc) is configured to be closed when the second phase branch works normally and to be opened when the second phase branch occurs a short-circuit;
    the second high-frequency branch is connected in parallel with the second switch (1SKc), and is configured to be opened when the second phase branch works normally and to provide the second high-frequency current to the second switch (1SKc) when the second phase branch occurs a short-circuit.

3. The system according to claim 2, wherein,
    the first high-frequency branch comprises:
        a first high-frequency switch (SPa) for controlling current discharge, configured to be opened when the first phase branch works normally and to be closed when the first phase branch occurs a short-circuit; and
        a first converter reactor (Lfa) and a first converter capacitor (Ca), connected in series with the first high-frequency switch (SPa), and configured to provide the first high-frequency current to the first switch (1SKa) when the first high-frequency switch (SPa) is closed;
    the second high-frequency branch comprises:
        a second high-frequency switch (SPc) for controlling current discharge, configured to be opened when the first phase branch works normally and to be closed when the first phase branch occurs a short-circuit; and
        a second converter reactor (Lfc) and a second converter capacitor (Cc), connected in series with the second high-frequency switch (SPc), and configured to provide the second high-frequency current to the second switch (1SKc) when the second high-frequency switch (SPc) is closed.

4. The system according to claim 3, wherein, a response time of the first high-frequency switch (SPa) and a response time of the second high-frequency switch (SPc) are both microseconds.

5. The system according to claim 3, wherein, the first converter capacitor (Ca) is charged in advance by a line voltage of the first phase branch and the third phase branch; and the second converter capacitor (Cc) is charged in advance by a line voltage of the second phase branch and the third phase branch.

6. The system according to claim 3, wherein, the first converter capacitor (Ca) and the second converter capacitor (Cc) are both charged in advance by an external power supply other than the three-phase AC.

7. The system according to claim 1, further comprising:
    a first current-limiting branch connected in parallel with the first high-frequency branch, wherein the first current-limiting branch comprises a first current-limiting reactor (La); and
    a second current-limiting branch connected in parallel with the second high-frequency branch, wherein the second current-limiting branch comprises a second current-limiting reactor (Lc).

8. The system according to claim 7, further comprising:
    a first energy-absorbing branch connected in parallel with the first high-frequency branch, wherein the first energy-absorbing branch comprises a first energy absorber (MOVa); and
    a second energy-absorbing branch connected in parallel with the second high-frequency branch, wherein the second energy-absorbing branch comprises a second energy absorber (MOVc).

9. The system according to claim 8, wherein, the first cabinet is further arranged with the first current-limiting branch and the first energy-absorbing branch; and the second cabinet is further arranged with the second current-limiting branch and the second energy-absorbing branch.

10. The system according to claim 9, further comprising:
    a three-phase switch located within the third cabinet and configured to open the three-phase AC.

11. The system according to claim 2, further comprising:
a first current-limiting branch connected in parallel with the first high-frequency branch, wherein the first current-limiting branch comprises a first current-limiting reactor (La); and
a second current-limiting branch connected in parallel with the second high-frequency branch, wherein the second current-limiting branch comprises a second current-limiting reactor (Lc).

12. The system according to claim 11, further comprising:
a first energy-absorbing branch connected in parallel with the first high-frequency branch, wherein the first energy-absorbing branch comprises a first energy absorber (MOVa); and
a second energy-absorbing branch connected in parallel with the second high-frequency branch, wherein the second energy-absorbing branch comprises a second energy absorber (MOVc).

13. The system according to claim 12, wherein, the first cabinet is further arranged with the first current-limiting branch and the first energy-absorbing branch; and the second cabinet is further arranged with the second current-limiting branch and the second energy-absorbing branch.

14. The system according to claim 13, further comprising:
a three-phase switch located within the third cabinet and configured to open the three-phase AC.

15. The system according to claim 3, further comprising:
a first current-limiting branch connected in parallel with the first high-frequency branch, wherein the first current-limiting branch comprises a first current-limiting reactor (La); and
a second current-limiting branch connected in parallel with the second high-frequency branch, wherein the second current-limiting branch comprises a second current-limiting reactor (Lc).

16. The system according to claim 15, further comprising:
a first energy-absorbing branch connected in parallel with the first high-frequency branch, wherein the first energy-absorbing branch comprises a first energy absorber (MOVa); and
a second energy-absorbing branch connected in parallel with the second high-frequency branch, wherein the second energy-absorbing branch comprises a second energy absorber (MOVc).

17. The system according to claim 16, wherein, the first cabinet is further arranged with the first current-limiting branch and the first energy-absorbing branch; and the second cabinet is further arranged with the second current-limiting branch and the second energy-absorbing branch.

18. The system according to claim 17, further comprising:
a three-phase switch located within the third cabinet and configured to open the three-phase AC.

* * * * *